Patented Feb. 16, 1926.

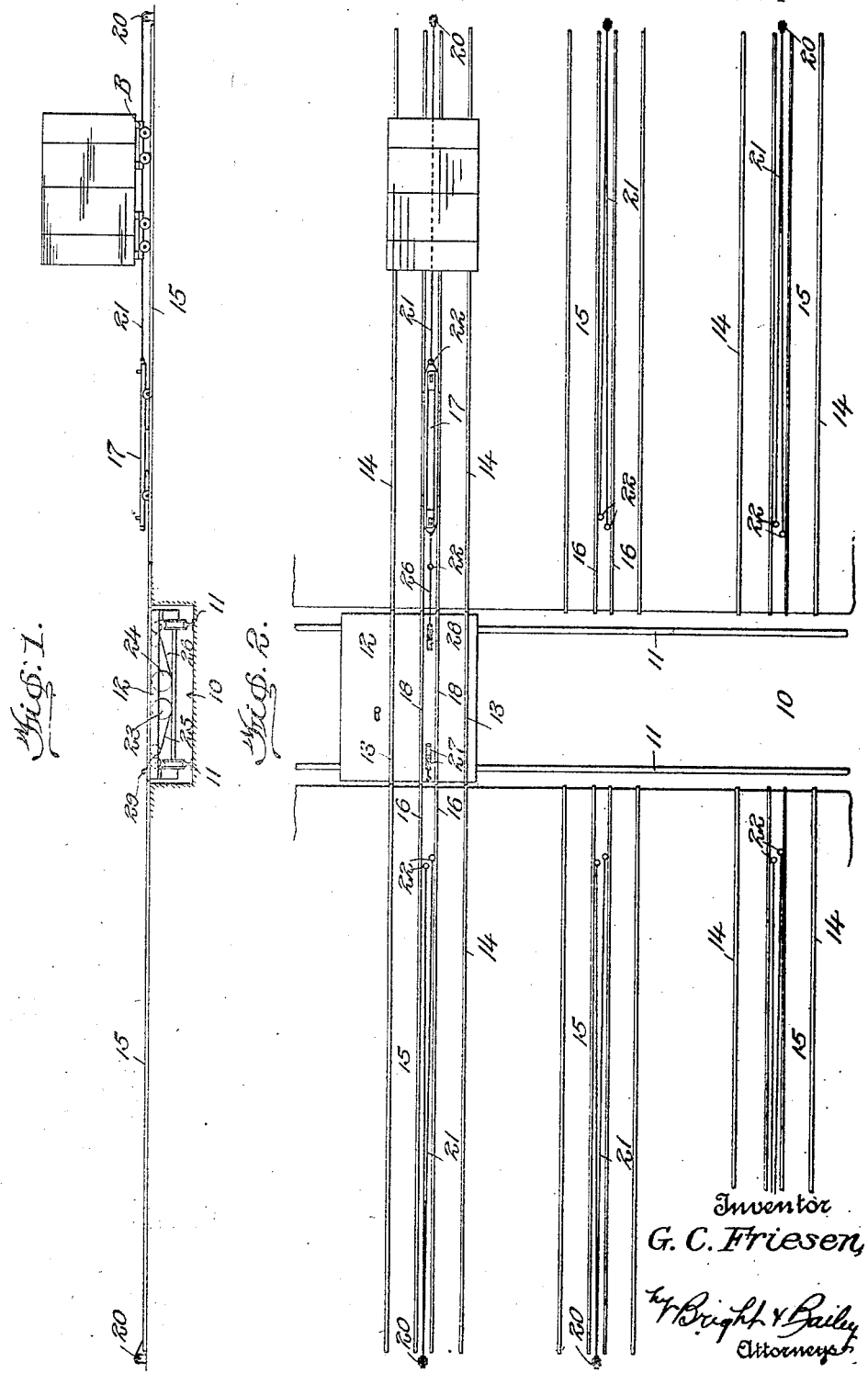

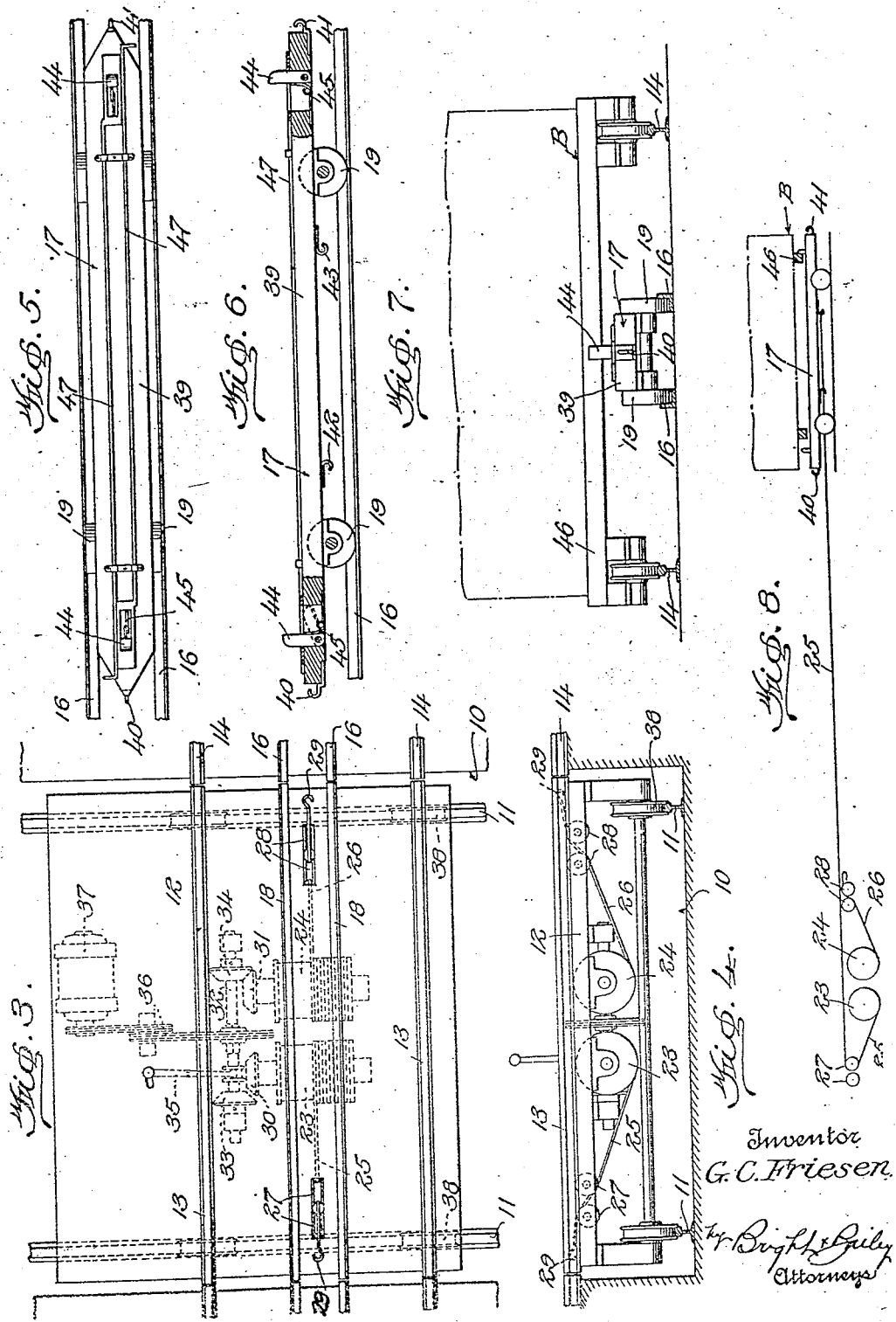

1,573,388

UNITED STATES PATENT OFFICE.

GEORGE C. FRIESEN, OF DALLAS, OREGON.

TRUCK MOVING APPARATUS.

Application filed June 4, 1925. Serial No. 34,884.

*To all whom it may concern:*

Be it known that I, GEORGE C. FRIESEN, a subject of the King of Great Britain, and resident of Dallas, in the county of Polk and State of Oregon, have invented certain new and useful Improvements in Truck Moving Apparatus, of which the following is a specification.

My invention relates to apparatus for moving loads of lumber or other material from one position to another, and has for its object to provide improved means to simplify and facilitate handling of the loads.

In the accompanying drawings which illustrate my invention in a preferred form and wherein like characters of reference denote corresponding parts in the different views:—

Fig. 1 is a diagrammatic side elevation of my improved apparatus;

Fig. 2, a diagrammatic top plan view;

Fig. 3, a top plan of the transfer car;

Fig. 4, a side elevation of the transfer car;

Fig. 5, a top plan of the automatic hook carrier;

Fig. 6, a side elevation, partly in section.

Fig. 7, an enlarged transverse sectional view showing the relation of the hook carrier to one of the load carrying trucks; and Fig. 8, a diagrammatic side elevation showing the manner in which a load carrying truck is moved onto the transfer car.

Referring to the drawings in detail, 10 designates an elongated pit having track rails 11 at the bottom thereof on which is mounted a transfer car 12, said car carrying track rails 13 adapted, by movement of said car along the rails 11, to be brought into alinement with the rails 14 of any one of a number of tracks 15 at either or both sides of said pit, whereby a load carrying truck or trucks B on any particular track 15 may be moved onto the car 12 and transported by the latter to a position where it may be moved off of said car onto another track 15, the tracks 15, as is understood, leading to any desired localities such, for example, as a storage yard, a drier or a tempering chamber.

Between the rails 14 of each track 15 are other rails 16 on which is adapted to travel what I term an automatic hook carrier, designated generally by the numeral 17, the transfer car 12 also having, between the rails 13 thereon, other rails 18 adapted for alinement with the rails 16 of any particular track 15 when the car is positioned to aline its rails 13 with the rails 14 of that track. Preferably, but not necessarily, the rails 16 and 18 are formed of angle iron and, as best shown in Fig. 7, the supporting wheels 19 of the hook carrier are adapted to ride on one flange and be guided by the other flange of each rail.

At or near the end of each track 15 remote from the pit 10 is affixed a pulley 20 and trained over each pulley 20 is a rope or cable 21 of sufficient length so that its ends, which are provided with eyes 22, reach substantially to the pit 10. These ropes or cables 21, respectively, constitute permanent parts of the respective tracks 15.

Suitably mounted on the transfer car 12 is a pair of drums 23, 24, having wound thereon, respectively, ropes or cables 25, 26 leading, respectively, over guide sheaves 27, 28 towards opposite sides of the car. The sheaves 27, 28 are disposed between the rails 18, 18 to conveniently position hooks 29 at the ends of the ropes or cables 25, 26 either for detachable engagement with the eye 22 at one end of the rope or cable 21 of any particular track 15 when the rails 13 on the car 12 are alined with the rails 14 of that track or for detachable engagement with a hook on the automatic hook carrier, for a purpose which will presently appear.

Affixed to the drums 23, 24 are bevel gears 30, 31, respectively, and adjacent to these gears is a shaft 32 having affixed thereto a pair of bevel gears 33, 34 so positioned that when said shaft is moved longitudinally a predetermined distance in one direction gear 33 is engaged with gear 30 and gear 34 is disengaged from gear 31, and when said shaft is moved a predetermined distance in an opposite direction gear 34 is engaged with gear 31 and gear 33 is disengaged from gear 30. By a partial movement only of said shaft, however, both gears 33, 34 may be disengaged from both gears 30, 31. A lever 35 is operatively connected to shaft 32 in any preferred manner for longitudinally shifting the same and said shaft is driven in any shifted position thereof by suitable gearing 36 between it and a motor 37 which is also mounted on the car 12. Thus, either drum may be set in operation to wind its associated cable thereon. Car 12 is of any preferred detail construction and carries wheels 38 which engage the rails 11 whereby it may be moved along said rails as aforementioned.

The automatic hook carrier 17, like the car 12, may be of any preferred detail construction provided it is sufficiently low and narrow to be moved along the rails 16 beneath a load carrying truck B on the rails 14, its purpose being to automatically engage with a load carrying truck when moved under the same so that the truck may be moved, by means of the cables 21 and 26 or 27, when the latter are properly connected with the hook carrier, onto and off of the car 12 and along the tracks 15. To this end said hook carrier consists in the present instance of a narrow elongated body portion 39 supported as aforementioned by the wheels 19 on the rails 16 for movement along the latter and carrying at its ends hooks 40, 41, respectively, and also carrying, intermediate its ends, other hooks 42, 43. Adjacent to each end of said body portion is a dog 44 pivoted for inward swinging movement and normally held in an upright position by a spring 45, so that when the hook carrier is moved under a load carrying truck the dog at the forward end of the carrier will swing downward upon contact with any portion of the truck it may engage to permit such movement, and thereafter will spring upward behind such portion—cross beam 46 of the truck for example—whereby the truck will be moved with the carrier when the latter is moved in an opposite direction. A rod 47 is operatively associated with each dog and leads to the other end of the carrier whereby the dogs may be manually manipulated to permit the carrier to be moved from beneath a truck whenever desired.

Assuming the car 12 to be positioned with its rails 13, 18 alined with the rails 14, 16 of a given track 15 and that it is desired to move a load carrying truck B positioned on said track to another track 15, the operation is as follows: One end of the cable 21 associated with the track on which the truck is positioned is engaged with the hook at the near end of the carrier 17, which latter under these conditions would be on the car 12, having been brought with the latter to its position mentioned, and the other end is engaged with the free end of the adjacent cable 25 or 26 as the case may be. By means of the lever 35 the proper drum 23 or 24 then is caused to be rotated to effect a pull on the cable 21 and move the hook carrier in the direction of and finally under the truck B, resulting in an automatic engagement of the carrier with the truck by means of one or the other of the dogs 44 as aforementioned. Cable 21 now is disengaged from the hook carrier and from cable 25 or 26 as the case may be, and the other of the latter is brought over and engaged with the proper hook 42 or 43 on the carrier, as shown in Fig. 8, so that when the other drum is rotated the hook carrier and with it the truck B is moved onto the car 12. Car 12 then is moved in any desired manner along track rails 11 until its rails 13, 18 are alined with the rails 14, 16 of the track 15 onto which it is desired to place the truck B, when said car is halted and the cable 21 of that track 15 is engaged at one end with the hook at the adjacent end of the carrier 17 and at its other end with the hook 29 at the free end of the adjacent cable 25 or 26 as the case may be. A pull then is exerted on said cable by means of the drum on which it is wound to pull the carrier and with it the truck off of the car 12 and along the track 15 to the position desired, the dog at the far end of the carrier then being manually depressed by means of the proper rod 47 and the carrier moved back onto the car 12 to be moved with the latter to another position. In this manner, and by different obvious hook-ups of the respective cables it is apparent that trucks may be shifted between different tracks 15 on either side of the tracks 11 with facility and slight manual effort.

I claim:

1. Apparatus for shifting trucks from one to another of different tracks and for moving trucks along said tracks comprising a member movable under a truck, means carried by said member automatically engageable with part of said truck when the member is moved under the same whereby the truck then is movable with the member, a car onto which said member and said truck are movable whereby they may be transported from one location to another, and means carried by said car for moving said member.

2. Apparatus for shifting trucks from one to another of different tracks and for moving trucks along said tracks comprising a car, rails on said car, said car being movable from a position with the rails thereon alined with the rails of one track to a position with the rails thereon alined with the rails of another track, a member movable under a truck and automatically engaging the latter when moved thereunder whereby the truck then is movable with the member, a cable associated with each track adapted for detachable engagement with said member, cables carried by said car adapted for detachable engagement with said member and with said first mentioned cables, and means also carried by said car to manipulate said cables to move said member along said track and onto and off of said car.

3. Apparatus for shifting trucks from one position to another comprising a movable car onto and off of which said trucks are movable, a member movable beneath a truck to be shifted, means carried by said member automatically engaging a truck when the member is moved thereunder whereby the truck then is movable with the member, and means on the car for moving said member.

4. Apparatus for shifting trucks from one position to another comprising a movable car onto and off of which said trucks are movable, a member movable beneath a truck to be shifted, a dog carried by said member automatically engaging a truck when the member is moved thereunder whereby the truck then is movable with the member, means on the car for moving said member onto and off of the same, and a rod operatively connected with said dog whereby the latter may manually be disengaged from said truck.

5. Apparatus for shifting trucks from one to another of different tracks and for moving trucks along said tracks comprising a car, rails on said car, said car being movable from a position with the rails thereon alined with the rails of one track to a position with the rails thereon alined with the rails of another track, a pulley permanently located at the end of each track remote from said car, a cable trained over each pulley, winding drums carried by said car, means for rotating said drums, a cable on each drum, a member movable under a truck, means carried by said member automatically engaging a truck when the member is moved under the same whereby the truck then is movable with the member, and devices carried by said member with which said cables are engageable whereby said member and truck may be moved by means of said drums onto and off of said car and along said tracks.

In testimony whereof I hereunto affix my signature.

GEORGE C. FRIESEN.